June 27, 1944.    F. B. HALFORD    2,352,478
VARIABLE RATIO TRANSMISSION MECHANISM
Filed March 26, 1942
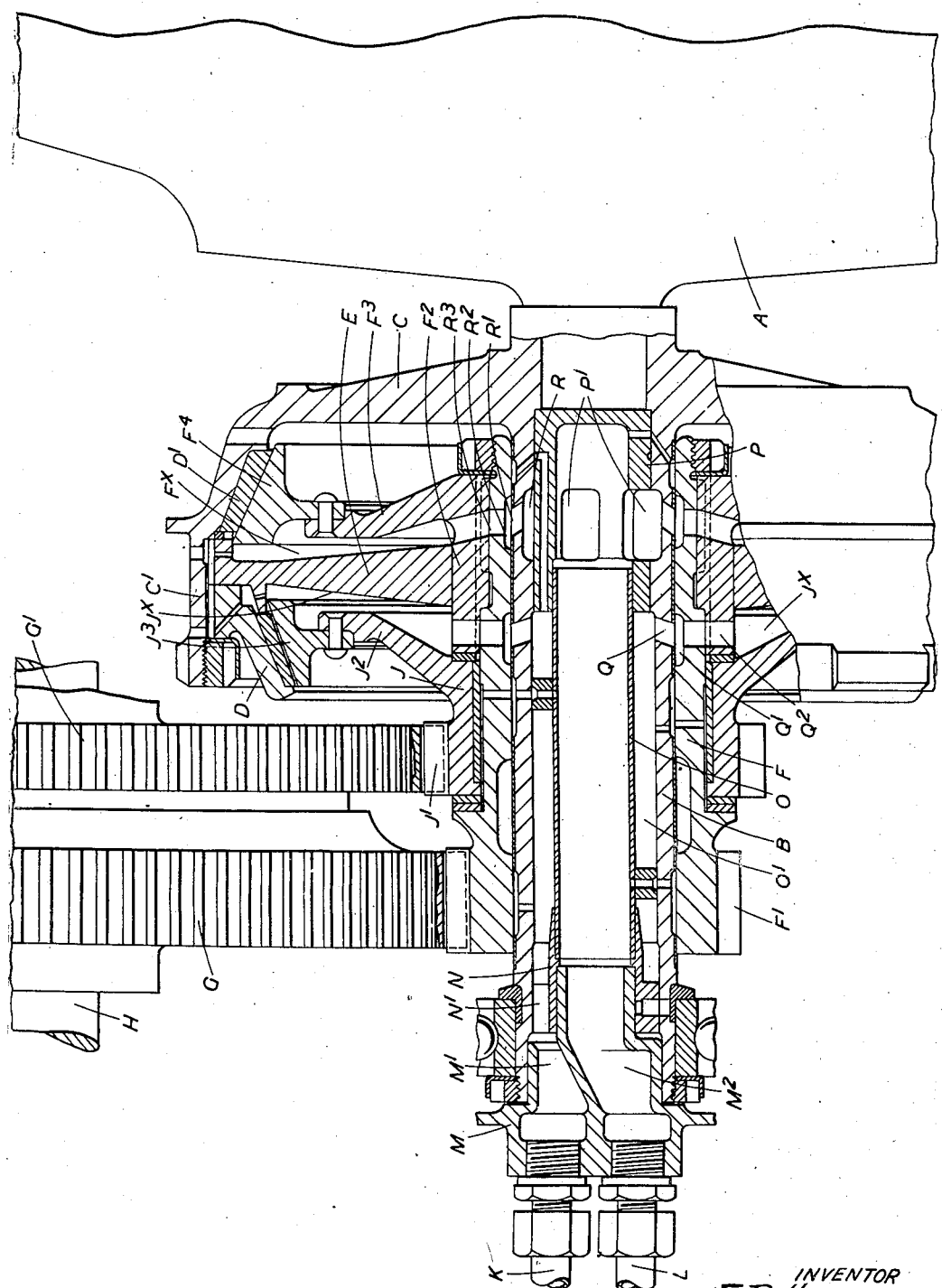
INVENTOR
F. B. HALFORD.
BY
ATTORNEYS Patented June 27, 1944

2,352,478

UNITED STATES PATENT OFFICE 2,352,478

VARIABLE RATIO TRANSMISSION MECHANISM

Frank Bernard Halford, Edgware, England, assignor to D. Napier & Son Limited, London, England, a company of Great Britain Application March 26, 1942, Serial No. 436,359
In Great Britain November 25, 1941

6 Claims. (Cl. 74—364)

This invention relates to variable ratio transmission mechanism and is an improvement on a known construction, the object of this improvement being to enable some reduction in weight to be effected in the construction and also some simplification with respect to certain parts.

According to this invention in combination with two gear wheels of different sizes on a driving shaft, there are provided two oppositely directed cone clutch members mounted in fixed relation to the impeller, two concentric shafts which are separately rotatable but both movable in the axial direction in relation to the impeller and its clutch members, each of these shafts carrying a clutch member adapted to engage one of the impeller clutch members and also a pinion meshing with one of the gear wheels on the driving shaft, and hydraulic means for imparting sliding movement to each of the two concentric shafts and thereby causing engagement and disengagement of the said clutch elements and the driving of the impeller at one or the other of two alternative speeds. The impeller is fixed on a shaft on which is also mounted a casing and within the latter and rotating with it are fixed two oppositely directed cone clutch members and between them an inwardly extending radial partition. Each of the two concentric shafts has on one end a disc which lies at one side of the partition in the impeller casing this disc carrying a clutch member adapted to engage one of the clutch members in that casing. On the other end of each shaft is the pinion by which it is driven. Liquid the flow of which is controlled by a cock, can be admitted to one side or the other of the partition where the pressure due to the liquid will cause the concentric shafts to slide and effect the engagement or disengagement of the clutch elements. The liquid pressure may be produced by centrifugal force or the liquid may be initially under pressure. The two concentric shafts with their clutch discs and pinions may be arranged so that under the influence of the liquid pressure they will slide together in one direction or the other, or each shaft may be mounted so that it can slide independently of the other.

The accompanying drawing shows in part-longitudinal sectional elevation and by way of example a construction of the mechanism in which the present improvements are embodied.

The impeller A is mounted on the end portion of a hollow shaft B which carries fixed thereon adjacent to the impeller a casing comprising a disc C on the periphery of which is a laterally extending flange-like part $C^1$ of which at least some portion is substantially cylindrical. Suitably fixed within the part $C^1$ of this casing are two cone clutch elements D $D^1$ and between them a partition E which runs radially inwards. A shaft F rotates freely on the shaft B and has on one end a pinion $F^1$ meshing with a gear wheel G on a driving shaft H. Splined on the other end of the shaft F is a sleeve $F^2$ with a disc $F^3$ carrying a clutch element $F^4$, the disc lying at one side of the partition E with the clutch element $F^4$ in position to engage with the clutch element $D^1$. The inner edge portion of the partition E bears on the sleeve $F^2$ but leaves the shaft F and sleeve $F^2$ free to slide longitudinally and rotate. A short shaft J rotates freely on the shaft F and has on one end a pinion $J^1$ meshing with the second gear wheel $G^1$ on the driving shaft H. On the other end of the shaft J is a disc $J^2$ which carries a clutch element $J^3$ where it can engage the clutch element D on the impeller casing. As will be seen the disc $J^2$ lies at the side of the partition E opposite to that at which is the clutch disc $F^3$. In the arrangement shown in the drawing the shaft J is so mounted on the shaft F that when the latter is moved in the axial direction the shaft J must slide longitudinally with it, but the two concentric shafts are separately rotatable.

The engagement and disengagement of the clutch elements $F^4$, $D^1$ and $J^3$, D, is brought about by the pressure of liquid admitted either into the space $F^x$ between the partition E and the clutch disc $F^3$, or into the space $J^x$ between the partition E and the clutch disc $J^2$. The flow of this liquid is controlled by a cock of suitable type, not shown on the drawing, from which the liquid passes through pipes K and L which lead into a hollow plug M held fixed in some convenient part, but lying within the end of the shaft B. The interior of the plug M is divided into two compartments into one of which $M^1$ passes the liquid from the pipe K while the liquid from the other pipe L flows into the compartment $M^2$. A socket member N within which lies the inner end part of the plug M, carries one end of a tube O whose other end is held by a hollow plug P fixed within the shaft B. From the compartment $M^1$ the liquid can flow by way of radial and longitudinal passages $N^1$ into the annular space $O^1$ around the tube O and thence by the radial passages Q, annular groove $Q^1$ and radial passages $Q^2$ into the space $J^x$. From the compartment $M^2$ which opens directly into the end of the tube O the liquid flows through that tube into the plug P and thence through openings $P^1$ in the wall of that plug into the annular groove R and from there through the radial passages $R^1$, annular groove $R^2$ and radial passages $R^3$ into the space $F^x$. Thus by determining by means of the control cock the liquid flow into the space $F^x$ or $J^x$ the impeller will be driven at one or the other of the two alternative speeds available.

The details of the construction with respect to the paths along which the liquid flows to effect the selection and engagement of the desired speed ratio may vary. Drainage passages are provided through which the liquid can escape from the spaces $F^x$ and $J^x$, but such flow away can of course occur only at a rate appreciably less than the inflow when permitted by setting the cock.

What I claim as my invention and desire to secure by Letters Patent is:

1. In variable ratio transmission mechanism of the type and for the purpose indicated, the combination of a driving shaft on which two gear wheels of different sizes are mounted together, a driven shaft on which an impeller may be mounted, two oppositely directed cone clutch members connected to the driven shaft in a position at one side of the said two gear wheels, two concentric shafts coaxial with said driven shaft and separately rotatable but both movable in the axial direction in relation thereto, a cone clutch member and a pinion on each of the said concentric shafts the clutch member being adapted to engage one of the clutch members on said driven shaft and the pinion meshing with one of the gear wheels on the driving shaft, and hydraulic means for moving the said concentric shafts in the axial direction and thereby causing engagement and disengagement of the clutch members on these shafts and the corresponding clutch members on said driven shaft whereby said shaft will be driven at one or the other of two alternative speeds.

2. In variable ratio transmission mechanism of the type and for the purpose indicated, the combination of a casing a driving shaft on which two gear wheels of different sizes are mounted together, a driven shaft on which an impeller may be mounted, two oppositely directed cone clutch members connected to the driven shaft in a position at one side of the said two gear wheels on and within the said casing, two concentric shafts coaxial with said driven shaft and separately rotatable but both movable in the axial direction of the shaft, a cone clutch member and a pinion on each of the said concentric shafts the clutch member being adapted to engage one of the clutch members in the casing and the pinion meshing with one of the gear wheels on the driving shaft, and hydraulic means for moving the said concentric shafts in the axial direction and thereby causing engagement and disengagement of the clutch members on these shafts and the corresponding clutch members in the casing connected whereby the driven shaft will be driven at one or the other of two alternative speeds.

3. In variable ratio transmission mechanism of the type and for the purpose indicated, the combination of a casing a driving shaft on which are two gear wheels of different sizes mounted together, a driven shaft on which an impeller may be mounted, two oppositely directed cone clutch members connected to said driven shaft in a position at one side of said two gear wheels, said clutch members being mounted on and within said casing with a partition extending inwardly from the casing between these clutch members, two concentric shafts coaxial with said driven shaft and separately rotatable but both movable in the axial direction in relation to the shaft, a disc carrying a clutch member on each of the said concentric shafts the two clutch-carrying discs lying on opposite sides of the said partition within the said casing with their clutch members adapted to engage the clutch members in the said casing, a pinion on each of these concentric shafts these pinions respectively meshing with the two said gear wheels on the driving shaft, and means for permitting liquid to enter the spaces on each side of the said casing partition and between that partition and the clutch-carrying discs the pressure of such liquid moving the said concentric shafts in the axial direction and thereby causing engagement and disengagement of the clutch members on these shafts and the corresponding clutch members in the casing whereby the impeller will be driven at one or othe other of two alternative speeds.

4. In variable ratio transmission mechanism of the type and for the purpose indicated, the combination of a casing a driving shaft on which two gear wheels of different sizes are mounted together, a driven shaft adapted to carry an impeller, two oppositely directed cone clutch members connected to said driven shaft in a position at one side of said two gear wheels, two concentric shafts coaxial with said driven shaft and separately rotatable but movable together in the axial direction in relation to said driven shaft, a cone clutch member and a pinion on each of said concentric shafts, the clutch member being adapted to engage one of the clutch members on said driven shaft and the pinion meshing with one of the gear wheels on the driving shaft, and hydraulic means for moving the said two concentric shafts simultaneously in the axial direction and thereby causing engagement and disengagement of the clutch members on these shafts and the corresponding clutch members on said driven shaft whereby the impeller will be driven at one or the other of two alternative speeds.

5. In variable ratio transmission mechanism of the type and for the purpose indicated, the combination of a driving shaft on which two gear wheels of different size are mounted together, a driven shaft adapted to support an impeller, a casing mounted on said driven shaft in a position at one side of said two gear wheels, two oppositely directed cone clutch members mounted on and within the said casing with a partition extending inwardly from the casing between these clutch members, two concentric shafts coaxial with said driven shaft and separately rotatable but movable together in the axial direction in relation to the impeller, a disc carrying a clutch member on each of the said concentric shafts the two clutch-carrying discs lying on opposite sides of the said partition within the said casing with their clutch members adapted to engage the clutch members in the said casing, a pinion on each of these concentric shafts these pinions respectively meshing with the two said gear wheels on the driving shaft, and means for permitting liquid to enter the spaces on each side of the said casing partition and between that partition and the clutch-carrying discs the pressure of such liquid moving the said two concentric shafts simultaneously in the axial direction and thereby causing engagement and disengagement of the clutch members on these shafts and the corresponding clutch members in the impeller casing whereby said driven shaft will be driven at one or the other of two alternative speeds.

6. In variable ratio transmission mechanism of the type and for the purpose indicated, the combination of a driving shaft on which two gear wheels of different sizes are mounted together, a shaft upon which an impeller is adapted to be mounted, two oppositely directed cone clutch members connected to the shaft in a position at one side of said two gear wheels, two hollow and concentric shafts on said driven shaft these two shafts being separately rotatable but both movable in the axial direction on said driven shaft and in relation to the impeller, a cone clutch member and a pinion on each of the said concentric shafts the clutch member being adapted to engage one of the clutch members on said driven shaft and the pinion meshing with one of the gear wheels on the driving shaft, and hydraulic means for moving the said concentric shafts in the axial direction on said driven shaft and thereby causing engagement and disengagement of the clutch members on these shafts and the corresponding clutch members on said driven shaft whereby the impeller will be driven at one or the other of two alternative speeds.

FRANK BERNARD HALFORD.